June 17, 1969 J. J. MISENCIK 3,450,939
SOLID STATE CONTROL SWITCH WITH INSTANT ON CHARACTERISTIC AND LOW WATTAGE COMPONENTS
Filed May 9, 1967
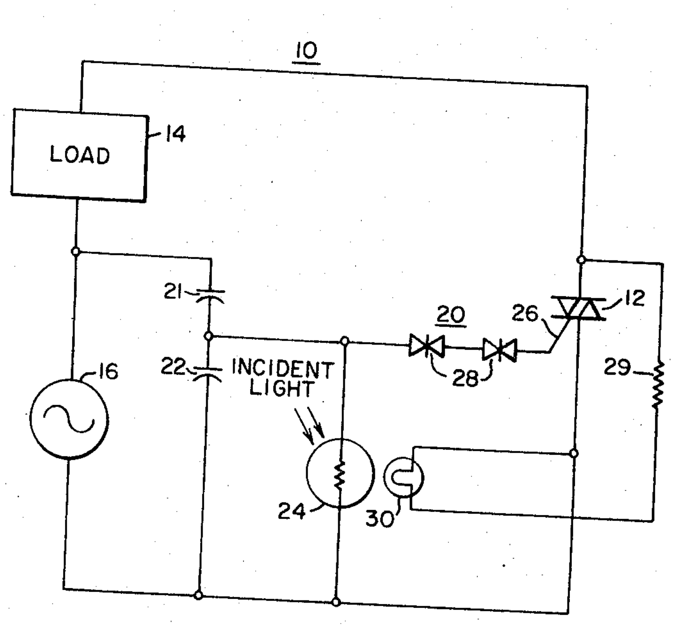
WITNESSES:
Bernard R. Gieguez
E. Strickland
INVENTOR
John J. Misencik
BY F. P. Lyle
ATTORNEY United States Patent Office 3,450,939
Patented June 17, 1969

3,450,939
SOLID STATE CONTROL SWITCH WITH INSTANT ON CHARACTERISTIC AND LOW WATTAGE COMPONENTS

John J. Misencik, Shelton, Conn., assignor to Westinghouse Electric Corporation, Pittsburgh, Pa., a corporation of Pennsylvania Filed May 9, 1967, Ser. No. 637,231
Int. Cl. H05b 37/02
U.S. Cl. 315—156 3 Claims

ABSTRACT OF THE DISCLOSURE

A circuit for controlling the application of an alternating supply voltage to a load in response to a predetermined condition, for example ambient light. The circuit comprises a solid state symmetrical switch connected in series with the load across the supply of voltage, and a gate circuit for the switch which includes two capacitors connected in series across the supply of voltage, a condition sensing means connected across one of the capacitors, and symmetrical trigger diode means connected between the gate terminal of the switch and the common junction of the capacitors and the condition responsive means. The circuit may include further a bias condition source, for example a light source, connected across the switch and disposed in energy transfer relationship with the condition sensing means.

*Background of the invention*

The present invention relates generally to solid state condition sensing circuits, and particularly to a control circuit in which the components including a condition sensing means dissipate a minimum amount of power and provide substantially instant switching for each half cycle of alternating voltage supplied to a load. The invention has particular utility in photocell control arrangements in which power is applied and removed from incandescent and other types of lamp loads in response to changes in ambient light without manual attention, though the invention is not limited thereto.

Heretofore, certain solid state switching devices employed to control the application of power to lamp loads have used a gate circuit in which a resistor-capacitor combination and photocell are employed to develop the gate signal. The capacitor is connected in parallel with the photocell, and the resistor is connected in series with the photocell across a supply of alternating line voltage so that the resistor and photocell are required to dissipate large amounts of electrical energy. This, in turn, requires large wattage components, and the photocell is required to operate at destructive temperatures which shorten the life of the photocell. The voltage lag inherent with the resistor-capacitor combination has the further disadvantage of delaying the gate signal so that the switching device is turned on at times late into the half cycle swings of the alternating supply voltage. Thus, the lamp loads are not energized until the photocell achieves its maximum control resistance.

*Summary of the invention*

The present disclosure describes a condition sensing control circuit that has none of the disadvantages of the prior art circuit described above. The present invention employs a photocell and a capacitor-capacitor combination for developing the gate signal for a solid state or semiconductor symmetrical switching device connected to apply an alternating line voltage to a load when gated by the gate signal. The capacitors are serially connected across the supply of alternating voltage with the photocell, preferably a photoresistor, connected across one of the capacitors. The gate terminal of the symmetrical switch is connected to the common junction of the capacitors and photocell through symmetrical trigger or avalanche diode means. With the lowering of ambient light intensity, the photocell increases its resistance and the consequent voltage developed across it by the alternate half cycle swings of the supply voltage. When the developed voltage reaches the trigger voltage level of the diode means, the diode or diodes conduct and apply the voltage to the gate of the symmetrical switch thereby turning the switch on; the switch applies the supply voltage to a load connected in series with the switch.

As can be readily seen, the power resistor of the prior art circuit is eliminated by use of a capacitor which inherently dissipates little energy, and the photocell, in the present invention, can be a less costly, low wattage device since it is not called upon to continuously carry and to dissipate a proportionate share of the energy of the supply voltage. The life of the cell is thereby extended, and the inherent voltage lag attendant with RC circuits is eliminated. After each voltage zero, the switching device is gated as soon as the voltage across the photoresistor reaches the diode trigger level.

The invention further includes a novel bias light circuit which provides the control circuit with a good hysteresis characteristic. The bias light or lamp is disposed in light communicating relationship with the photocell, and is electrically connected across the symmetrical switch. When the switch is open, the supply voltage is available to energize the bias lamp, and when the switch is closed, the lamp is shorted and goes out. In this manner the resistance of the photocell is changed in an amount corresponding to the light intensity of the bias lamp. This change effected in the photocell resistance separates the on and off switching times of the control circuit to provide a substantially square loop hysteresis characteristic for the circuit that prevents it from energizing and deenergizing the load when the ambient light tends to hold at a former switching point.

*Description of the drawing*

The objects and advantages of the invention will be more apparent from the following detailed description taken in connection with the accompanying drawing, in which:

The sole figure shows a schematic representation of a condition sensing control circuit constructed in accordance with the principles of the present invention.

*Preferred embodiment*

Specifically, there is shown in the figure a condition sensing control circuit generally designated 10 which includes a solid state symmetrical switch 12 adapted to be connected in series with a load 14 and a supply of alternating voltage 16. The symmetrical switch is capable of conducting current in both directions when gated.

The control circuit 10 further includes a gate circuit 20, for the symmetrical switch 12, which includes two capacitors 21 and 22 serially connected across the voltage supply 16, and between the load 14 and one power terminal of the switch. Across the capacitor 22 is connected a condition sensing device, for example, a light sensing photoresistor 24, though the invention is not limited to the sensing of only light conditions. The photoresistor is of the type that exhibits resistance changes in inverse proportion to the amount of ambient light intensity it receives.

The common junction between the capacitors 21 and 22 and the photoresistor 24 is connected to gate terminal 26 of the symmetrical switch 12 through symmetrical avalanche diode means 28. Two such diodes are shown in the figure, the number chosen depending upon the electrical parameters of the particular circuit involved. The symmetrical avalanche diode is a trigger diode device capable of conducting current in either direction when its trigger voltage level is attained thereacross.

Across the symmetrical switch 12 is connected a current limiting resistor 29 in series with a lamp means 30 disposed in close proximity to and in light communicating relationship with the photoresistor 24.

As mentioned above, the photocell 24 is of the type that exhibits a resistance change in inverse proportion to the amount of ambient light received. In operation, with the ambient intensity holding at a relatively high level, the resistance of the cell 24 will remain relatively low. The supply voltage 16 develops across the capacitors 21 and 22 for each half cycle with a minimum of current flow through the photocell and a minimum of voltage developing across the capacitor 22 because of the low resistance state of the photocell connected thereacross. The minimum voltage developed across the photocell is insufficient to trigger the diodes 28 so that the symmetrical switch 12 is ungated and the lamp load 14 is not energized. With the switch ungated (open), the bias lamp 30 is energized by the supply voltage since it is connected directly across the switch. With the ambient light and the light from the bias light directed upon the photocell, the resistance of the cell is kept at a minimum value.

As can be readily seen, the charge constants of the capacitors are utilized to develop the voltage for triggering the diodes 28, thereby allowing the photocell 24 to carry only a minimum amount of current. Thus, the photocell can be a low wattage device, and the high wattage resistor (required in prior art circuits) is eliminated.

As the ambient light decreases, the resistance of the photocell 24 increases as well as the voltage developed thereacross. When the decreasing light intensity reaches a predetermined level (determined by the voltage required to trigger the diodes 28) the voltage across the photocell triggers the diodes so that a discharge path is created through the diodes and the symmetrical switch for discharge of the capacitors 21 and 22. The discharge voltage gates the switch which applies the supply voltage to the lamp load 14. Since the diodes 28 are symmetrical devices, current will be conducted through them in both directions so that the symmetrical switch is gated for each half cycle swing of the supply voltage. Thus, the full voltage from the supply 16 is applied to the load through the gated switch; the bias lamp 30 is shorted thereby and goes out.

With darkness or a light intensity level below that sufficient to trigger the diodes 28, the symmetrical switch 12 remains "on" (gated) and power remains applied to the load 14. The bias light 30 remains off.

When the ambient light begins to increase, the resistance of the photocell 24 begins to decrease with a corresponding decrease in the voltage developed across the cell. When the ambient light intensity reaches a point which lowers the voltage across the photocell to a level insufficient to trigger the diodes 28, the symmetrical switch is turned off by loss of its gate signal. Power is thereby removed from the load 14 and applied to the bias lamp 30 through the resistor 29.

When the symmetrical switch 12 is turned on (gated), the bias lamp 30 is shorted and goes out as mentioned above. The resistance of the cell 24 and the voltage developed across it instantly increases by an amount corresponding to the intensity of the bias lamp. This instant increase in cell resistance and voltage shifts the "on"

switching point of the circuit 10 away from the former "off" point in the direction of lower light intensity by the amount of the light intensity of the bias lamp. In a similar manner, when the ambient light level increases to a point that the voltage developed across the photocell 24 is insufficient to trigger the diodes 28, and the switch 12 turns off thereby turning on the bias lamp 30, the light intensity of the energized lamp instantly lowers the resistance and voltage drop of the photocell by an amount corresponding to the lamp light intensity. This shifts the "off" switching point away from the former "on" point in the direction of increased light intensity, the direction of the increasing ambient light. With such an operation, the circuit 10 is never allowed to oscillate or hunt about a former switching point when the ambient light is changing very slowly or fluctuating. This eliminates the possibility of repeated energization and deenergization of the load with such an ambient light condition.

It should now be apparent from the foregoing description that a novel, simple, low cost and effective circuit has been disclosed which operates to control the application of an alternating voltage to load means in response to a predetermined condition. The novel circuit requires a minimum of components, and does not require high wattage components since a series capacitor arrangement (which does not dissipate energy) is employed to develop a gate signal for a symmetrical switch in combination with a photocell and trigger diode means. The circuit has further a good hysteresis characteristic by virtue of the bias light provided by the lamp 30 connected across the symmetrical switch.

Though the invention has been described with a certain degree of particularity, it should be noted that changes may be made therein without departing from the spirit and scope of the invention.

What is claimed is:

1. A circuit for controlling the application of an alternating supply voltage to a load in response to a predetermined condition, said circuit comprising a solid state symmetrical switch connected in series with the load across the supply voltage, a gate circuit for said symmetrical switch including at least two capacitors connected in series across the supply voltage, a condition responsive means connected across one of the capacitors, and symmetrical trigger diode means connected between the gate terminal of said switch and the common junction of the capacitors and the condition responsive means.

2. The circuit of claim 1 in which the condition responsive means is a light sensitive device.

3. The circuit of claim 2 in which a bias lamp means is electrically connected across the symmetrical switch and physically disposed in light communicating relationship with the light sensitive device.

References Cited

UNITED STATES PATENTS

| | | | |
|---|---|---|---|
| 2,043,671 | 6/1936 | McMaster | 315—156 |
| 3,342,996 | 9/1967 | Crusinberry | 250—206 |
| 3,378,733 | 4/1968 | Jensen | 315—156 X |

JAMES W. LAURENCE, *Primary Examiner.*

E. R. LA ROCHE, *Assistant Examiner.*

U.S. Cl. X.R.

250—206; 307—311; 315—159